United States Patent [19]

Van Daele

[11] 4,200,060

[45] Apr. 29, 1980

[54] HOG FEEDER

[75] Inventor: Antoine Van Daele, Maldegem, Belgium

[73] Assignee: Chore-Time Equipment, Inc., Milford, Ind.

[21] Appl. No.: 959,297

[22] Filed: Nov. 9, 1978

[51] Int. Cl.² ............................................. A01K 5/02
[52] U.S. Cl. .................................. 119/56 R; 119/53
[58] Field of Search ............ 119/51 FS, 51 CF, 51.11, 119/52 AF, 52 R, 53, 56 R; 222/437, 457, 509, 559

[56] References Cited

U.S. PATENT DOCUMENTS

| 984,980 | 2/1911 | Taylor | 119/53 |
|---|---|---|---|
| 2,577,927 | 12/1951 | Stockmar | 222/509 |
| 2,742,185 | 4/1956 | Landry | 222/457 X |
| 2,799,431 | 7/1957 | Bush et al. | 222/457 X |
| 3,325,055 | 6/1967 | Marshall | 222/70 |
| 3,598,087 | 8/1971 | Ramser | 119/51.11 |
| 3,742,913 | 7/1973 | Crippen | 119/56 R X |
| 3,971,340 | 7/1976 | Allen | 119/53 X |

FOREIGN PATENT DOCUMENTS 2341893  3/1974  Fed. Rep. of Germany ...... 119/52 AF

*Primary Examiner*—Russell R. Kinsey
*Assistant Examiner*—Robert P. Swiatek
*Attorney, Agent, or Firm*—Trexler, Wolters, Bushnell & Fosse, Ltd.

[57] ABSTRACT

A feeder for livestock and the like is disclosed. The feeder has a feed receiver body for receiving and storing a flow of feed from a conveyor. A drop tube means extends from the feed conveyor into the feed receiver body, and includes at least one wall mounted for vertical motion relative to a fixed wall. When the moveable wall is in a raised position, that moveable wall and the fixed wall define a vertically oriented opening through which feed can pass from the drop tube into the receiver body. By adjusting the position of the moveable wall, the amount of feed collected in the receiver can be correspondingly changed. When a stopper valve member is drawn away from a discharge opening, the feed pile collected in the receiver body is discharged from the receiver for livestock consumption. A stopper actuator includes a flexible member connected to the stopper valve, and a rotatable windup device connected to the flexible member. When the windup device is rotated, the flexible member is wound up and draws the stopper valve away from the discharge opening.

10 Claims, 5 Drawing Figures

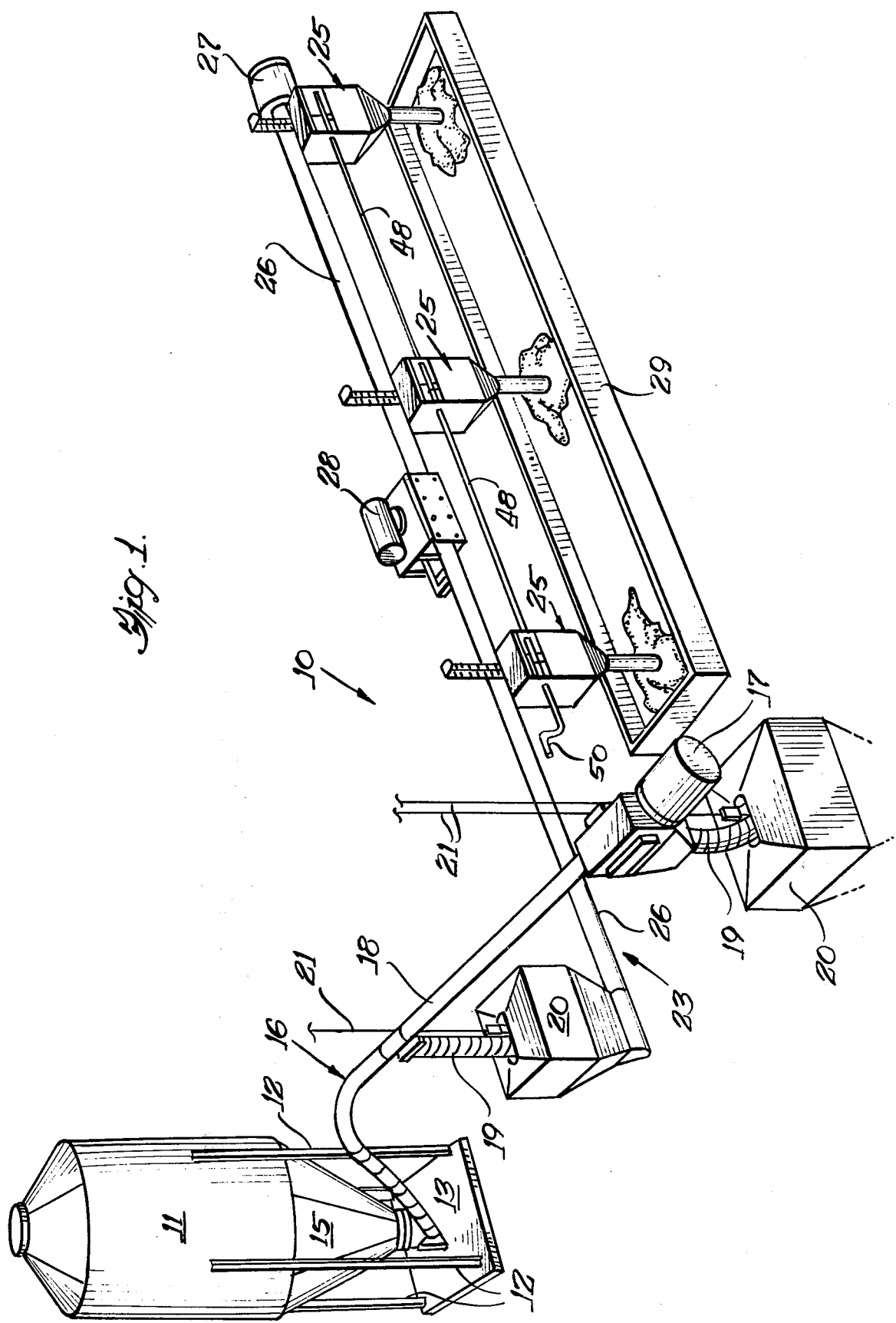

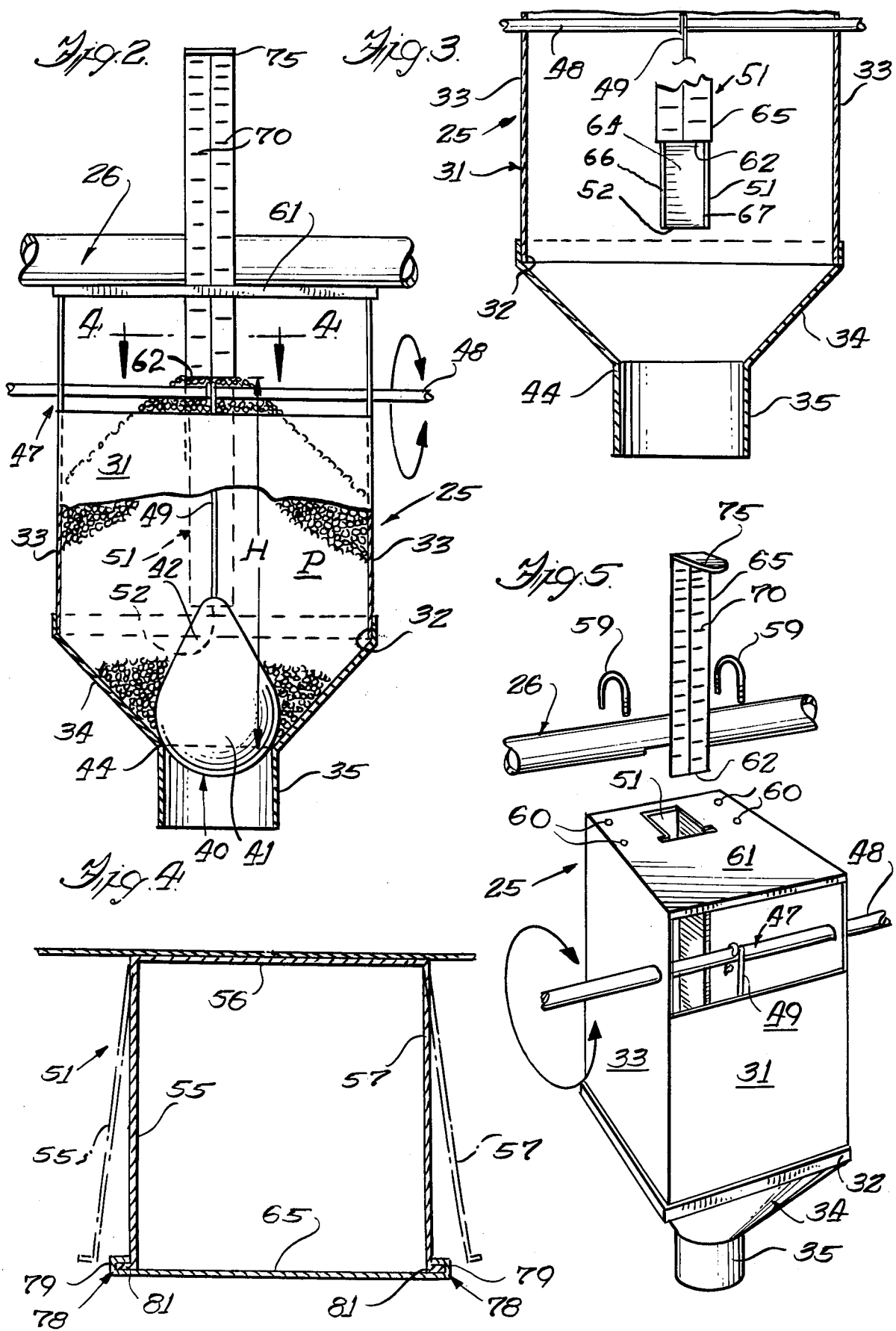

HOG FEEDER

BACKGROUND OF THE INVENTION

This invention relates generally to livestock feeding equipment, and more particularly concerns equipment for collecting, storing and dispensing an accurately-measured amount of feed to hogs and like livestock.

Modern livestock husbandry has become increasingly concerned with accurately measuring and then dispensing amounts of feed to livestock such as hogs. U.S. Pat. No. 3,325,055 to Marshall describes and claims one such system. Another such system currently meeting with great commercial success is described and claimed in co-pending application Ser. No. 893,883 filed Apr. 6, 1978.

It is the general object of the present invention to provide a relatively inexpensive yet highly effective feeder which can be used to collect an accurately pre-measured amount of feed, and then to quickly and completely dispense that premeasured amount of feed to hogs or like livestock.

A more specific object is to provide such a feed receiver which will collect and dispense a wide range of feed amounts. In other words, it is a specific object to provide such a feeder which will collect and dispense small amounts of feed, or moderate amounts of feed, or very large amounts of feed, simply by making an easy adjustment in the feed receiver.

Yet another object is to provide such a feeder in which the amount of feed to be collected and then dispensed can be measured with great accuracy. An associated object is to provide such a feeder in which the amount of pre-measured feed to be collected can be set quickly and easily.

A still further object is to provide such a feeder which can be used with a wide variety of feeds and in a wide variety of application environments.

Other objects and advantages of the invention will become apparent from reading the following detailed description and upon reference to the drawings. Throughout the drawings, like reference numerals refer to like parts.

BRIEF DESCRIPTION OF THE DRAWINGS

FIG. 1 is a perspective view showing a feed transporting, receiving and dispensing system embodying and including the present invention;

FIG. 2 is an elevational view, in partial section, of the novel feeder of the present invention;

FIG. 3 is a fragmentary sectional view similar to FIG. 2 but showing the lower portion of the feeder, a feed stopper valve being omitted for clarity of illustration;

FIG. 4 is a sectional view taken substantially in the plane of line 4—4 in FIG. 2; and FIG. 5 is a partially exploded perspective view of the feed receiver.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIG. 1, there is shown a feed dispensing and transporting system 10 embodying the present invention. Generally speaking, feed is delivered to and preliminarily stored in a large bin 11, which can be mounted by posts 12 upon a foundation 13. This bin 11 can be located either inside or outside a livestock shed or house (not shown). Feed collected in a lower boot member 15 is drawn from the bin 11 by a conveyor 16, which here comprises an auger member (not shown) rotated within the tube or pipe 18 by an electric motor 17 or other motive means. Feed traveling along this conveyor 16 is dispensed through drop pipes 19 to relatively large hoppers 20 which can be suspended in overhead positions from cables 21.

From this header conveyor 16 and the hoppers 20, one or more branch conveyors 23 draw feed for delivery to feeders 25 embodying several aspects of the present invention. Again, these branch conveyors 23 can include hollow tubes or pipes 26 within which are disposed auger members (not shown) for rotation by electric motors 27 or other motive power. Box mechanisms 28 can be provided to control feed flow over relatively long stretches of the branch conveyor 23. Feed is discharged from the feeder unit 25 into one or more troughs 29 located for access by the livestock.

To collect an accurately-measured amount of livestock feed P, and then dispense that feed pile P, the feeder 25 includes a body 31 for receiving and storing a flow of feed from the conveyor 26 and, extending from a body bottom 32, a boot member 34 as shown in FIGS. 2, 3 and 5. Accurate control of feed flow from the feeder 25 is encouraged by a discharge chute 35. To encourage rapid and complete feed flow from the receiver body 31, this boot 34 and chute 35 can be integrally made of a plastic resin having a smooth interior finish. This one-piece boot 34 encourages quick and even feed flow through the discharge chute 35, and discourages feed bridging action and hang-up phenomena within the body 31 of the dispenser 25 when feed is to be discharged. The body 31 has a rectangular cross-section defined by sides 33 to provide a compact feeder shape and to provide a relatively linear scale or relationship between the height H of the feed pile P stored within the feeder 25 and the amount of feed mass in the stored pile. Further, this constant-size cross-sectional shape permits the body walls 33 to be oriented substantially vertically so as to encourage feed flow from the feeder 25.

Feed flow from the dispenser 25 is controlled by a stopper valve 40. This stopper valve element 40 can be considered to be generally pear-shaped, and includes a substantially semi-spheroidal bottom element 41 integrally formed with a conical top element 42. As more particularly shown in FIG. 2, a semi-spheroidal bottom element 41 fits snugly and securely within a discharge opening 44 which defines the mouth of the discharge chute 35. Thus, although the stopper element 40 may come to rest in any one of a variety of positions in and upon the discharge opening 44, complete feed flow halting action is afforded.

The stopper element 40 encourages complete, rapid feed discharge from the feeder 25 when the stopper 40 is drawn away from the discharge opening 44 into the discharge position. To accomplish this stopper pulling in accordance with one aspect of the invention, the stopper 40 is attached to a stopper pull system 47, which here comprises a rotatable shaft 48 to which are connected a series of branch flexible lines 49. When the shaft 48 is rotated, as by a crank 50 or motor or other known means, the flexible cord members 49 are each wound upon and drawn upwardly from the position shown in FIG. 2. This stopper pull system 47 thus pulls the stopper 40 away from the associated discharge openings 44 and the chutes 35 in each of the feeders 25, thereby permitting simultaneous discharge actions from a number of feeders 25 in the trough 29. It will be noted that the windup shaft 48 is of uniform cross-section to permit it to be easily slipped through the sides 33 of the receiver body 31. During use, the shaft is thus supported by the receiver body 31 itself.

In accordance with another aspect of the invention, the height H of the feed pile P to be developed within the feeder 25 can be easily and quickly adjusted with great precision. This enables the livestock husbandman to deliver precise amounts of feed to the livestock. To this end, a feed drop tube 51 extends from the feed conveyor tube 26 into the feeder body 31, and here terminates at an open bottom end 52. The feed drop tube mechanism 51 includes at least one fixed side 55; in the illustrated embodiment, the feed drop tube 51 is of rectangular or square cross-sectional shape, as shown in FIG. 4, and includes three such fixed sides 55, 56 and 57. It will be understood that the drop tube body cross-sectional shape could be circular, or some other shape without departing from the scope of the invention. The drop tube can be mounted at one side of the receiver body so as to be out of the way of the action of the stopper valve pull system 47. The drop tube sides 55-57 can be positioned directly below the conveyor 26 by providing U-bolts 59 extending over and around the conveyor 26 and through appropriate apertures 60 in the top 61 of the receiver.

A moveable drop tube side 65 is frictionally secured to the fixed drop tube sides 55 and 57, and can be raised or lowered through a range of positions. When the moveable side is raised or lowered, a moveable side bottom edge 62 is correspondingly raised and lowered. As can be envisioned from FIGS. 2 and 3, a vertical opening 64 is thus defined by the moveable wall bottom 62 and by edges 66,67 of the respective fixed sides 55 and 57. Thus, feed entering the drop tube 51 from the conveyor tube 26 can pass from the drop tube 51 through the vertical opening 64 and into the receiver 25 proper. As feed enters the drop tube 51 from the conveyor 26, a feed pile P is created. Now the height H of this feed pile will continue to rise until that height H reaches the bottom edge 62 of the vertical or moveable wall 65. Since the feed being delivered is particulate, as opposed to fluid, the vertical position of this bottom edge 62 will define the maximum height H to which the feed pile P can rise. By adjusting the vertical side 65, the location of the bottom edge can be adjusted, and the maximum height H and consequent amount of feed in the feed pile P will also be changed.

After feed has risen to the height of the bottom edge 62 of the vertical wall 65, additionally delivered feed collects, or backs up, within the upper portions of the drop tube 51 until the feed back-up action reaches the conveyor 26. When the feeder 25 is thus effectively filled, feed within the conveyor tube 26 simply moves past the filled feeder to other downstream feeders, as can be envisioned from FIG. 1. When the vertical side 65 is lowered, so as to locate its bottom edge 62 at a relatively lower position, a relatively shorter pile P of feed having a smaller height H will be collected within the feeder body 31 before the feed back-up collecting action begins to occur within the drop tube 51. Thus, a smaller amount of feed will be retained for subsequent dispensing to the livestock.

In carrying out the invention, a scale 70 can be applied to the moveable side 65. When the top 61 of the feeder 25 is used as a scale index, this scale 70 can be arrayed and aligned to show the amount of feed which will be contained within the feeder 25. If desired, several such scales 70 can be noted, as by paint, printing, decal application or otherwise, upon the side 65 so as to provide feed amount information relative to several feed formats. A tab or handle 75 can be extended at right angles to the moveable side 65 to permit the side 65 to be easily and quickly raised or lowered.

In carrying out the invention, this side 65 is frictionally interconnected to the fixed walls 55 and 57. Here, this frictional interconnector 78 is provided by reversely-turned ears or tabs 79, formed on the moveable wall 65. These tabs 79 can extend continuously along the length of the side 65; they engage mating ears 81 formed on the adjacent fixed walls 55,57.

Proper frictional engagement can be encouraged by originally forming the fixed walls 55 and 57 in an outwardly splayed condition as illustrated particularly in FIG. 4. During assembly, these walls 55 and 57 are squeezed or otherwise urged toward one another so as to permit the tabs 79 of the moveable side 65 to be slipped over the ears 81. These tabs 79 and the ears 81 thus provide a proper frictional interaction so as to assure that the moveable side 65 can be located and will remain at any desired vertical position so as to assure that the proper amount of feed is delivered to and maintained within the feeder 25.

The invention is claimed as follows:

1. A feeder for livestock and the like, comprising, in combination, feed receiver body means for receiving and storing a flow of feed from a conveyor in communication with the feeder, discharge valve means in communication with the receiver body to alternatively permit and inhibit feed discharge action from the feeder, and drop tube means extending from the feed conveyor into the feed receiver body means, the drop tube means including at least one drop tube fixed wall and at least one drop tube moveable wall mounted for vertical motion relative to the drop tube fixed wall, the walls, when the moveable wall is in the raised position, defining a vertically oriented opening through which feed can enter the receiver body.

2. A feeder for livestock and the like according to claim 1 wherein said moveable wall is partly defined by a bottom edge, wherein said fixed wall is partly defined by at least one side edge, and wherein said vertical opening is at least partly defined by the moveable wall bottom edge and the fixed wall side edge, whereby the feed can pass from the drop tube into the receiving body to the height of the moveable wall bottom edge.

3. A feeder according to claims 1 or 2 including interconnector means interconnecting the fixed wall and the moveable wall so as to hold the moveable wall on the fixed wall at any one of a range of moveable wall positions.

4. A feeder according to claim 1 wherein said discharge valve means includes a stopper valve carried within the receiver body to alternatively permit and inhibit feed discharge action from the feeder, and stopper actuator means, the stopper actuator means including a flexible member connected to the stopper valve, and rotatable windup means connected to the flexible member, which, upon rotation, operates to wind up the flexible means and to thereby draw the stopper valve means so as to permit feed discharge action from the feeder.

5. A feeder for livestock and the like comprising, in combination, feed receiver body means for receiving and storing a flow of feed from a conveyor in communication with the feeder, boot means extending from the receiver body means and defining a discharge opening, stopper valve means carried in the receiver, and stopper actuator means attached to the stopper valve means, the actuator means including a flexible member connected to the stopper valve means, and rotatable windup means connected to the flexible member which, upon rotation, operates to wind up the flexible means and to thereby draw the stopper valve means away from the discharge opening, so as to permit feed discharge action from the feeder.

6. A feeder according to claim 5 wherein said windup means includes an elongate shaft member extending through the receiver body.

7. A feeder according to claim 5 including drop tube means extending from the feed conveyor into the feed receiver body means, the drop tube means including at least one drop tube fixed wall located within the receiver body, and at least one drop tube moveable wall mounted for vertical motion through a range of positions relative to the drop tube fixed wall, the walls, when the moveable wall is in a raised position, defining a vertically oriented opening through which feed can enter the receiver body from the drop tube.

8. Feeding apparatus comprising, in combination, an elongated feed transporting and dispensing conveyor, a plurality of feeder receiver units associated with the conveyor for receiving a flow of feed from the conveyor and for temporarily storing the received feed, each feed receiving unit including a feed receiver body for receiving and storing a flow of feed from the conveyor means, boot means extending from the receiver body means and defining a discharge opening, stopper valve means carried in each receiver and adapted to be moved away from the respective discharge openings, thereby permitting feed discharge action from the receiver, the feeding apparatus further comprising stopper valve pull means extending from each stopper valve means in each feeder unit for moving the stopper valve means in each unit away from the respective discharge openings, the stopper valve pull means including a flexible means extending from each stopper valve means, and a rotatable windup shaft means extending between at least two feed receivers and being connected to the flexible members within each feed receiver, the windup shaft means operating, upon rotation, to wind up each connected flexible means and to draw each stopper valve means away from the respective discharge opening, thereby permitting feed discharge action from each feeder.

9. A feeder according to claim 8 further including drop tube means extending from the feed conveyor into at least one of said feed receiver bodies, the drop tube means including at least one drop tube fixed wall extending into that feed receiver body, and at least one drop tube moveable wall mounted for vertical motion through a range of positions relative to the drop tube fixed wall, the walls, when the moveable wall is in a raised position, defining a vertically oriented opening through which feed can enter the receiver body.

10. A feeder according to claim 9 wherein said vertical wall is at least partly defined by a bottom edge, wherein the fixed wall is at least partly defined by at least one side edge, and wherein the vertical opening is at least partly defined by the moveable wall bottom edge and the fixed wall side edge, whereby the feed can pass from the drop tube into the receiver body to the height of the moveable wall bottom edge.

* * * * *